July 21, 1931.  G. M. M. GRANT  1,815,354
PISTON RING
Filed Nov. 8, 1930
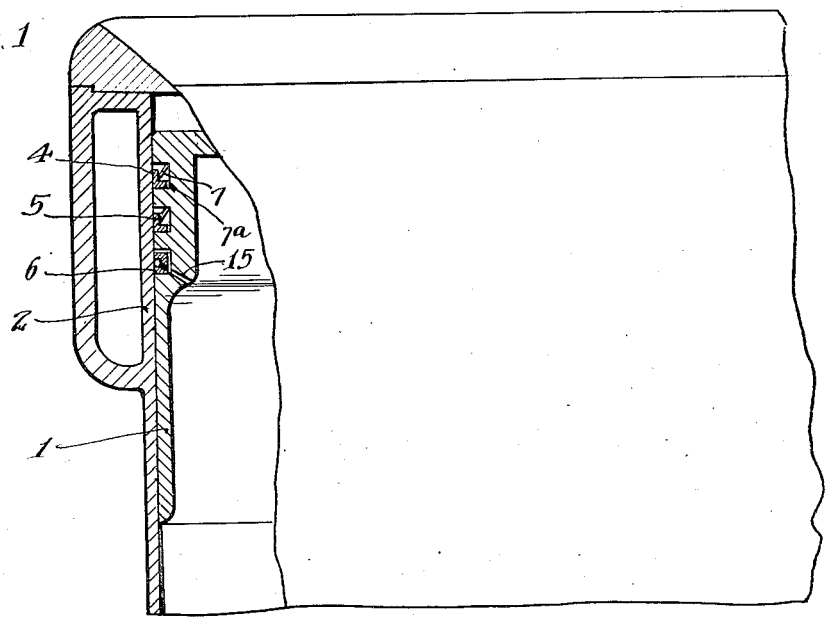
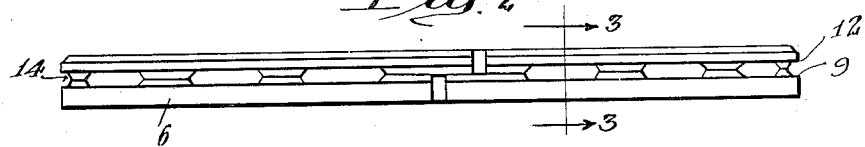
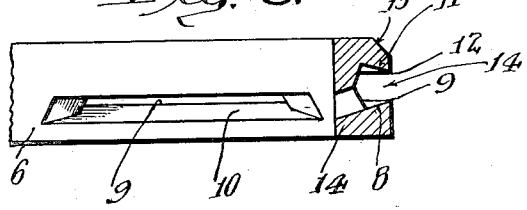
Inventor
Gerald M. M. Grant
By Lyon & Lyon
Att'ys Patented July 21, 1931

1,815,354

UNITED STATES PATENT OFFICE

GERALD M. M. GRANT, OF LOS ANGELES, CALIFORNIA

PISTON RING

Application filed November 8, 1930. Serial No. 494,345.

This invention relates to piston or packing rings and more particularly to what is commonly termed oil seal rings as used particularly in the packing of the pistons of internal combustion engines.

This invention relates to an improvement over that form of structure disclosed in a patent issued to Wefing, February 6, 1923, Number 1,444,407.

The principal object of my invention is to provide an oil seal ring which will effectively prevent oil from passing by the piston of an internal combustion engine.

Another object of this invention is to provide an oil seal ring which is provided with an annular recess in its outer periphery which is formed to cause lubricant picked up from the wall of the piston to pass freely and unobstructed to the interior of the piston and so as to avoid the accumulation in the piston ring of lubricant picked up from the wall of the piston, and hence the clogging of the passages formed through the oil seal ring with the oil as picked up.

Other objects and advantages of this invention it is believed will be apparent from the following detailed description of a preferred embodiment thereof as illustrated in the accompanying drawings.

In the drawings:

Figure 1 is a sectional view of a piston indicating the same as positioned within a fragment of the cylinder of an internal combustion engine, and including a piston ring embodying my invention.

Figure 2 is an edge elevation of the piston ring embodying my invention.

Figure 3 is an enlarged sectional edge view taken substantially on the line 4—4 of Figure 2.

Figure 4 is an enlarged sectional rear edge view of a fragment of a modified form of the piston ring embodying my invention.

In the preferred embodiment of my invention illustrated in the accompanying drawings, there is shown a piston 1 mounted within a fragment of a cylinder 2. The piston 1 may be of any suitable or desirable construction such as is commonly employed in internal combustion engines and is herein illustrated as including three peripheral grooves within which packing or piston rings 4, 5 and 6 are mounted. The rings 4 and 5 may be of any suitable or desirable construction such as is well understood in the art and as herein illustrated are rings of the general form of piston rings sold under the trade name of "Sure-Seal". These rings are formed to include a relatively thin gray iron cast ring provided at its rear with an annular shoulder upon which a spring 7 is mounted in a manner to thrust the rings downwardly relative to the piston upon which they are mounted toward the lower portion of the annular grooves 7a within which they are mounted.

The ring 6 is of the type commonly termed an "oil seal" ring and is mounted in the lowermost circumferential groove of the piston 1 and is provided for the purpose of preventing excess lubricating oil from passing by the piston into the firing chamber of the internal combustion engine.

The oil seal ring 6 herein illustrated includes a ring and is provided on its exterior periphery with a circumferential groove 14 which is of greater width to the rear of the outer periphery of the ring than at the edge thereof. The groove is formed in this manner by making two cuts from the periphery of the ring by means of cutting tools which are mounted at an angle from the periphery of the ring. In this manner there is not only formed a ring having a groove of greater width within the body of the ring, but the ring is provided with a downwardly inclined wall 8 down which lubricant scraped from the wall of the cylinder 2 by the relatively sharp edges 9 and 12 of the ring passes.

The forming of the upper wall 11 of the groove 14 inclined provides a ring at its periphery with a second scraping edge 12 which aids in the picking up of the lubricant from the wall of the cylinder 2 on the down stroke of the piston 1. The forming of the groove 14 of greater width at its rear than at its point of contact with the wall of the cylinder 2 eliminates the danger of clogging the annular groove 14 with lubricant as picked up from the cylinder wall.

In order to return the oil through the piston ring to the interior of the piston as the oil is picked up from the walls of the cylinder 2, the ring 6 is slotted preferably from its inner periphery on an angle corresponding substantially with the angle of the inclined wall 8 to provide a continuously inclined path or surface 10 down which the lubricating oil accumulating within the annular groove 14 of the ring 6 passes to behind the piston ring 6 in the annular groove of the piston 1. In order to permit the lubricant to pass from within this groove to within the piston, the piston is provided around its periphery within the groove in which the ring 6 is mounted with a series of inclined ports or passages 15 through which the accumulated lubricant flows to within the piston.

The cuts formed in the inner periphery of the piston ring communicating with the annular recess 7a formed in the outer periphery of the piston ring are preferably formed as close together as the structural characteristics of the ring will stand so as to provide as free flow of the lubricant from the annular groove 14 as possible. The ports or passages thus formed are formed elongated to provide as nearly as possible unrestricted flow of lubricant as picked up from the piston wall through the oil ring.

It is obvious that the same results could be obtained by forming the elongated ports from the outer periphery of the ring as are obtained by forming the elongated ports or passages from the inner periphery of the ring, the essential characteristic being that there be provided in the ring an annular groove having at its rear a greater width than at the periphery of the ring and the passage formed through the ring being formed inclined downwardly so that the lubricant as picked up will pass freely through the oil seal ring.

The piston ring embodying my invention works equally well in dry motors as in wet motors, due to the fact that the piston ring embodying my invention requires only a relatively light wall pressure. The piston ring embodying my invention and employing a relatively light wall pressure will not break through the thin film of wall on the cylinder wall and starve the motor of oil. This is due to the fact that the piston ring takes advantage of the force of gravity, allowing the oil to flow freely through the oil ring from the cylinder wall and does not depend upon heavy wall pressure.

In the operation of the piston ring embodying my invention on the down stroke of the piston, the edge 12 will take the excess oil off the cylinder wall.

Due to the angle of the upper wall 11 relative to the cylinder wall, the excess oil will immediately rush to the upper end of the wall 11 on the down stroke of the piston. On the up stroke of the piston this oil will drop to the position within the oil ring at the end of the downwardly inclined wall 6 where it is joined by excess oil that is being taken off the cylinder wall by the edge 9, and the oil thus accumulated on the end of the wall 6 rushes down the inclined path 10 to the back of the ring 6 and then flows through the ports 15 of the piston and is returned to the crank case.

The upper portion of the piston ring 6 above the annular groove 14 is preferably tapered as indicated at 13 to permit the ring 6 to slide over excess oil when traveling toward the compression chamber of the cylinder rather than pushing the oil ahead of it into the compression chamber.

The modified form of oil seal ring 6a illustrated in Figure 5 is similar to the oil seal ring heretofore described with the exception that in this ring the oil transfer grooves or passages 10a are formed spaced around the periphery of the ring. The oil transfer grooves 10a are formed by milling the grooves either from the inner periphery or outer periphery of the ring to provide a continuously inclined path 20a from the inner to the outer periphery of the ring 6a.

Thus an inclined oil passage wall 21a is formed which is inclined from the outer to the inner periphery of the ring and a second cut is taken from the outer periphery of the ring to form the upper scraping edge 12a and the upper inclined wall 11a for the same purpose as the scraping edge 12 and inclined wall 11a provided in the modification heretofore set forth.

In this form of ring there is formed a substantially continuous peripheral groove interrupted only by the webs 22a which hold the sections of the ring together. The operation of this ring is substantially the same as the operation of the ring heretofore set forth.

Having fully described my invention, it is to be understood that I do not wish to be limited to the details herein set forth, but my invention is of the full scope of the appended claims.

I claim:

1. A packing ring having a peripheral groove formed therein, the said groove being of greater width within the body of the ring than at the periphery of said groove, the portion of said ring defining the inner wall of said groove being free from projections, said groove having downwardly inclined oil passages communicating with said peripheral groove and extending through and to the back of said ring.

2. A packing ring having a peripheral groove of greater width within the body of the ring than at the periphery of said groove, the portion of said ring defining the inner wall of said groove being free from projections, said groove having downwardly inclined oil passage slots communicating with the peripheral groove and extending through and to the back of said ring.

3. A packing ring having a peripheral groove of greater width within the body of the ring than at the periphery of said groove, the portion of said ring defining the inner wall of said groove being free from projections, said groove having downwardly inclined oil passage slots starting from the point of greatest width of the peripheral groove and extending through the rear wall of said ring.

4. A packing ring having a peripheral groove of greater width within the body of the ring than at the periphery of said groove, the portion of said ring defining the inner wall of said groove being free from projections, the groove defining a lower inclined wall and downwardly inclined oil passages formed of substantially the same incline as the said lower inclined wall, and formed in substantially the same plane with said lower inclined wall.

5. In a device of the class described, the combination of a cylinder, a piston mounted in said cylinder, the piston having a peripheral groove in which packing rings are mounted, one of said packing rings being formed with downwardly inclined oil passages from the outer periphery to the inner periphery thereof, said oil passages being of greater width within the body of said ring than at the outer periphery thereof and the portion of said ring defining the inner walls of said oil passages being free from projections to allow the free flow of lubricant as picked up by said packing ring to the interior of said packing ring, and oil passages formed through the wall of said piston from the peripheral groove in which said ring is mounted to the interior of said piston to allow discharge of the lubricant picked up by said ring into the interior of said piston.

Signed at Los Angeles, California, this 4th day of November, 1930.

GERALD M. M. GRANT.